Oct. 24, 1961     F. J. HOOVEN     3,005,664
BRAKING CONTROL SYSTEM
Filed Aug. 7, 1957
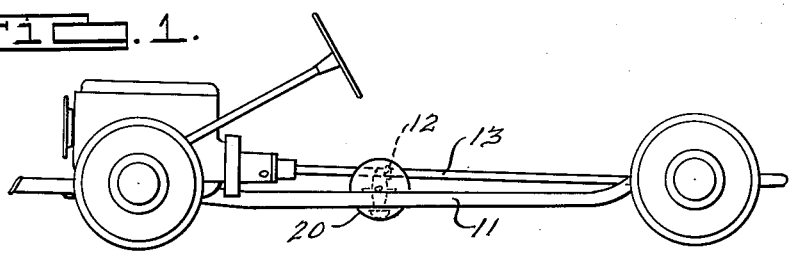
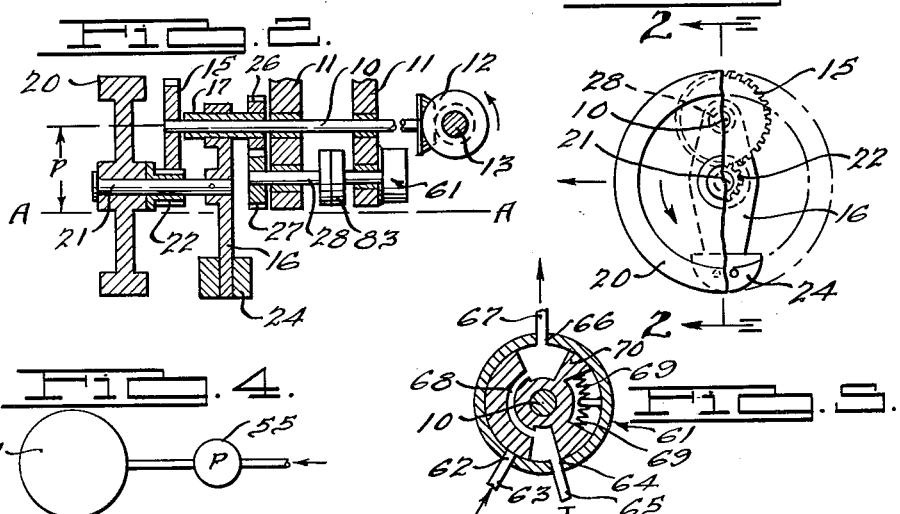
INVENTOR.
Frederick J. Hooven,
BY
Harness, Dickey & Pierce
ATTORNEYS.

though the velocity of the vehicle may be changing at a high rate.

3,005,664
BRAKING CONTROL SYSTEM
Frederick J. Hooven, 7 Lone Pine Court,
Bloomfield Hills, Mich.
Filed Aug. 7, 1957, Ser. No. 676,826
7 Claims. (Cl. 303—24)

This invention relates to brake control mechanisms and particularly to a brake control mechanism which regulates the pressure to a safe amount.

One of the greatest safety problems of the modern motor vehicle is the tendency to lock the wheels under conditions of maximum brake application, thus causing a complete loss of controllability. In an emergency, the driver tends to apply his brakes to the maximum extent, and it requires more cool skill than most drivers possess to deliberately restrain the brake application to a point short of wheel-slip, especially under conditions of reduced wheel adhesion, such as water or ice. Many lives are lost through loss of control due to wheel-slip while braking.

It is generally recognized that under almost all conditions the maximum deceleration that can be obtained is that provided by a non-slipping contact between the tires and the road, and that when the tires are caused to slip the force is decreased from this maximum. In accordance with the present invention the brake application is controlled and limited to that necessary to produce maximum deceleration, and short of that required to lock the wheels, regardless of the degree of adhesion between road and tire.

It is, therefore, an object of this invention to provide means for the control of the braking action of a motor vehicle to secure a maximum safe braking effect but without causing wheel-slip.

It is also an object to provide means for limiting the maximum application of vehicle brakes to a value less than that required to lock the wheels.

It is a further object to provide means for measuring the relative values of the angular deceleration of the wheels of a vehicle and the linear deceleration of said vehicle, and to limit the force applied to the brakes of said vehicle in accordance with a normal and predetermined relation between these two values.

In the drawings, which illustrate a preferred embodiment of the invention:

FIG. 1 is a side view of the chassis of a typical vehicle on which the device of the present invention is mounted;

FIG. 2 is a sectional view of the structure illustrated in FIG. 3 taken on the line 2—2 thereof and looking toward the front of the vehicle showing the sensing device, or deceleration responsive device for measuring the angular deceleration of the wheels of the vehicle and comparing it to the linear deceleration of the vehicle;

FIG. 3 is an elevational view of the sensing device;

FIG. 4 is a diagrammatic view of a suitable means for controlling the braking system of a vehicle in accordance with the operation of the sensing system; and FIG. 5 is a detail sectional view through a control valve.

Referring to FIGS. 1, 2 and 3 there is shown a shaft 10 mounted on the vehicle frame 11 and coupled with the road wheels of the vehicle, as for example, being driven through bevel gears 12 from the drive shaft 13 which is normally connected to the two rear wheels of the vehicle. A gear 15 is mounted on the shaft 10 and is secured thereto to rotate therewith. A pendulum arm 16 is mounted on a sleeve 17 which is freely rotatable on the shaft 10, but is not connected thereto. An inertia element in the form of a flywheel 20 is mounted on a pin 21 fixed to the pendulum 16 off center from and below the sleeve 17.

The inertia element is rotatably mounted on the pendulum on low friction bearings and is free to turn with respect to the pin 21. Fixed to the flywheel 20 is a pinion 22 which meshes with the gear 15. A bob weight 24 hangs from the pendulum arm 16. The sleeve 17 is fixed to a gear 26 to freely rotate on the shaft 10, the gear meshing with a gear 27 on a shaft 28 fixed in the frame 11. It will thus be apparent that the swinging of the pendulum 16 about the axis of the sleeve 17 will produce a corresponding angular rotation of the shaft 28. The axis of the shaft 10 is transverse to the vehicle, and is coupled to the road wheels in such a way that turns in a direction opposite to that of the road wheels as the flywheel 20 turns in the same direction as the road wheels, as shown by the arrows in FIG. 2 illustrating the conditions for forward travel. The shaft 28 forms a control member the function of which will be described below.

It is assumed, for example, that the system has a mass of $m$ with a center of gravity along the line A—A, which is a distance $p$ below the axis of sleeve 17 about which the pendulum swings. It is further assumed that $r$ expresses the ratio between the gear 15 and the pinion 22 and that $w$ expresses the angular velocity in radians per second of the shaft 10, so that the angular velocity of the flywheel 20 will be $rw$. It is still further assumed that $I$ represent the moment of inertia of the flywheel 20 and that $V$ represents the velocity of the vehicle. Since the shaft 10 is geared to the wheels of the vehicle there will be a constant relationship between $V$ and $w$ whenever the vehicle wheels are not slipping, and this relationship may be expressed as $w=kV$. Whenever the vehicle is subject to deceleration, thus producing a change of velocity $dV/dt$ there will be produced a corresponding change in the angular velocity of the shaft 10, $dw/dt$, and it will also be true that $dw/dt=kdV/dt$. The inspection of FIGS. 1 and 2 will show that whenever there is a change in the speed of shaft 10 this change will be resisted by the inertia of the flywheel 20, thus producing a torque tending to swing the pendulum 16 in the direction of the change of velocity of the shaft 10. Thus when the vehicle is proceeding normally in the forward direction, and the shaft is turning in the direction of the arrow, an application of the brakes will cause the shaft to slow down, and the change of angular velocity will oppose the arrow so that the pendulum will tend to swing in such a way as to cause the bob weight 24 to move toward the rear of the vehicle. However, the linear deceleration of the vehicle itself will be resisted by the weight of the whole assembly tending to maintain its forward velocity, so that there will be a tendency for the bob wegiht 24 to move toward the front of the vehicle.

The torque, $t_w$, due to the deceleration of the flywheel may be expressed as:

$$t_w = Ir^2 k dV/dt$$

while the torque due to the deceleration of the vehicle may be expressed as:

$$t_v = mpdV/dt$$

so that if $mp=Ir^2k$ the two torques will be equal and opposite, and the pendulum will not swing either forward or back so long as the relationship $w=kV$ remains true, which is to say, so long as the wheels do not slip. Thus it may be seen that in the absence of wheel-slip the pendulum 16 will at all times describe a true vertical line, independently of change of speed of the vehicle. Under these conditions the reaction force on the pendulum assembly in response to change in speed or deceleration of the vehilce is opposite and substantially equal to the counter force developed and transmitted to the pendulum as a result of slowing down of the flywheel so that the pendulum remains balanced in its normal position.

Whenever there is wheel-slip while braking, the change in angular velocity of the wheels will exceed the proportionate value of $k$ in relation to the change in vehicle speed, so that $t_w$ will exceed $t_v$. Under these conditions the pendulum will swing to the rear thus rotating the shaft 28 to operate a control system for the application of the brakes. For the purpose of illustration a typical control system is shown in FIG. 2 employing a servo brake in which the brake application is caused to be reduced by the rearward swing of the pendulum 16, there being other types of servo brakes known to those skilled in the art which may also be employed.

A brake pedal 50 on an arm 51 is connected to a brake operating cylinder 52 in accordance with conventional practice, while the servo action is effected by the cylinder 53. The cylinder 53 is operated from the accumulator 54, which may be either of the pneumatic or hydraulic type, charged by a pump 55. The cylinder 53 is controlled by spool valve 56 which is connected to a fulcrum point 57 of the arm 51, which fulcrum point is allowed to float through a small distance 58 against a spring 59. It will be seen that application of force to the arm 51 in the direction of the arrow will cause a movement of the valve 56 to permit fluid to flow from the accumulator 54 into the cylinder 53. When the force exerted by the cylinder 53 balances the reactive force at the fulcrum 57, the valve 56 will return to neutral, while the moment arm between the lines of force of the cylinders 52 and 53 provides a proportionate feel for the pedal arm. An anti-servo cylinder 60 is connected to the pedal arm 51 above the fulcrum point 57 in position to move the valve 56 to neutral position when fluid is applied thereto, thus venting the cylinder 53 and removing its servo action. By mounting the cylinder 60 above the fulcrum point 57 a reverse moment to the arm 51 occurs tending further to reduce the brake application effort. The cylinder 60 is operated from the accumulator 54 through a valve 61 (FIG. 5), which is connected to the control shaft 28 and actuated by the pendulum arm 16. The valve 61 has a port 62 connected to the accumulator by a line 63 and a discharge port 63 connected to a tank by a line 65. A port 66 is connected by a line 67 to the cylinder 60. An internal passage 68 is provided in a valve spool 70, the spool having a pair of light centering springs 69 associated therewith which returns it to the neutral position when it is disconnected from the shaft 28.

A cylinder 71, connected to the brake hydraulic line, in parallel relation to the cylinder 52 and a cylinder 72 connected to the servo line in parallel relation to the cylinder 53, have their pistons 76 and 77 connected together by a rod 73 which is urged to the left by a light spring 74. As the brake application is increased and the pressure in the brake line increases, the tendency of the piston 76 to be forced out of the cylinder 71 is counteracted by the increasing pressure in the servo line, acting through the cylinder 72 and the piston 77. When the anti-servo mechanism is in operation, however, and the pressure reduces in the cylinder 72, the piston 76 is permitted to move outward in the cylinder 71, thus releasing the pressure in the brake line. A heavy spring 79 is normally retained out of operation by a cylinder 81, which is connected directly to the accumulator 54. In the absence of pressure in the accumulator, the heavy spring 79 forces the piston 76 into the cylinder 71 and holds it there against any operating pressure providing a safety measure against failure in the event of loss of accumulator pressure.

Since the pendulum arm 16 normally holds a true vertical position regardless of the attitude or acceleration of the vehicle, as explained above, and the reference body of the valve 61 is necessarily attached to the vehicle, it may be seen that a permanent attachment of the operating shaft of valve 61 to the pendulum arm 16 would provide unsatisfactory operation in the event the vehicle happened to be on an up or down grade at the moment of brake application, inasmuch as the valve 61 would be out of the neutral position in the absence of wheel-slip. To avoid such a situation the electric clutch 83 is interposed between the control member 28 of the pendulum 16 and the valve 61, so that the two are normally disconnected. However, when the brake pedal is depressed, a switch 85 is closed, thus energizing an electrically actuated clutch 83 from a battery 87, and the control member 17 is then coupled with the valve 61.

The system operates in the following manner. With the vehicle traveling forwardly and the brake pedal not actuated, the control device is disconnected from the servo system at the clutch 83 and has no effect whatever thereon. The flywheel 20 is, however, being driven at a speed corresponding to that of the vehicle, and thus a reference condition for the vehicle speed is established and maintained, changing and responding to all changes in the vehicle speed. That is, while accelerations or decelerations of the vehicle result in the tendency of the pendulum to swing forwardly or rearwardly about the axis of the sleeve 17, such tendency is opposed by the inertia of the flywheel and as long as the wheels turn without skidding, these forces balance and the pendulum maintains a vertical position.

With the vehicle traveling on level ground, the pendulum 16 will assume the position indicated in the drawing, hanging vertically and perpendicular to the plane of the vehicle. Should the attitude of the vehicle change, such as in going up hill or down hill, the normal position of the pendulum will remain vertical but it will change relative to the vehicle, swinging rearwardly when the vehicle is going up hill and forwardly when it is going down hill.

Assuming now that the brake is applied, the magnetic clutch 83 is immediately energized and the sleeve 17 connected to the pendulum is thereby coupled to the valve 61 in the position then occupied by the pendulum. That is, if the pendulum is displaced due to the attitude of the vehicle, its normal position with respect to the operation of the present control device will be established as in that displaced position, and hence the system adapts itself to whatever the condition of the vehicle may be in this regard.

If the braking application is such that the vehicle wheels continue to turn during deceleration, the forces acting on the pendulum will continue in balance and the pendulum will continue to occupy its normal position. Under these conditions the valve 61 remains closed and the system operates in all respects in the ordinary way.

When, however, the wheels lock or slide as in a skid there is a marked difference between the forward travel of the vehicle and the rate of rotation of the wheels. The pendulum will then swing toward the rear, and in doing so will rotate the sleeve 17 and the shaft 28 to actuate the valve 61 in the clockwise direction, as viewed in FIG. 5, to close the port 64 and open the ports 62 and 66 so that fluid flow occurs from the accumulator through the passage 68 to apply fluid pressure to the cylinder 60, in such direction as to oppose the pressure on the brake pedal. Thus the excessive or improper depression of the pedal is counteracted and the locked action on the wheels is thereby released. As soon as the wheels are again turning in relation to the speed of travel of the car the pendulum 16 returns to a normal position, the valve 61 closes the port 62 and vents the cylinder 60 back to the tank. The counteracting force on the brake pedal is thus withdrawn.

It will thus be clear that the invention provides a highly desirable system for preventing wheel skid from any speed of travel of the vehicle, and from any change of the vehicle with respect to the horizontal. It likewise will be evident on analysis that the system properly responds regardless of the coefficient of friction between the vehicle wheels and the highway, and specifically will properly control the braking action whether the road is dry, or whether it is slippery and covered with ice. In all cases the system provides for maximum braking action without producing wheel-slip, and it, therefore, follows that the invention provides for the most rapid deceleration possible under whatever road conditions the vehicle encounters. The invention, therefore, fulfills an important and desirable function in contributing to overall safety of vehicles both for the vehicle itself and with respect to others who might be injured unless the vehicle can be brought to a stop with the maximum effectiveness.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A braking control system for a vehicle having wheels, a brake, a brake pedal, the combination with means for applying said brake upon the actuation of said pedal comprising a pendulum mounted on an axis extending transversely of the vehicle and subject to a reaction force in response to change in the forward linear velocity of the vehicle, a rotatable inertia element, means for coupling said inertia element with said wheels for rotation in co-ordinated relation with the angular velocity thereof, means for coupling said inertia element to said pendulum such that changes in the angular velocity of said wheels proportional to changes in the linear velocity of the vehicle produces forces opposite and substantially equal to said reaction force on said pendulum leaving said pendulum in balance in a normal position, a control member movable by said pendulum in response to movement away from said normal position upon slippage of said wheels, means connected to said braking system and operable by said control member for reducing the braking action of said brake in response to slippage of said wheels, and means for coupling said control member with said pendulum in response to actuation of said brake pedal.

2. A braking control system for a vehicle having wheels, a brake, a brake pedal, the combination with means for applying said brake upon the actuation of said pedal comprising a pendulum mounted on an axis extending transversely of the vehicle and subject to a reaction force in response to change in the forward linear velocity of the vehicle, a rotatable inertia element, means for coupling said inertia element with said wheels for rotation in co-ordinated relation with the angular velocity thereof, means for coupling said inertia element to said pendulum such that changes in the angular velocity of said wheels proportional to the changes in the linear velocity of the vehicle produces forces opposite and substantially equal to said reaction force on said pendulum leaving said pendulum in balance in a normal position, a control member movable by said pendulum in response to movement away from said normal position upon slippage of said wheels, means operable in response to actuation of said brake pedal for coupling said pendulum to said control member in the position said pendulum then occupies regardless of the attitude of the vehicle, and means connected to said braking system and operable by said control member for reducing the braking action of said brake in response to slippage of said wheels.

3. In a braking control system for a wheeled vehicle having a brake and an actuating pedal therefor, the combination with means responsive to the angular deceleration of the wheels of a vehicle, means responsive to the linear deceleration of the vehicle, differential means for comparing the relative response of said two responsive means, means operable by said differential means in response to a measured difference in said responsive means occurring upon slippage of the wheels of said vehicle for regulating the application of said brake to oppose the braking action while said wheel slippage occurs, a clutch for selectively connecting said pendulum to said operable means, and means connected to said brake for operating said clutch.

4. In a braking control system for a wheeled vehicle having a brake, the combination of a pendulum, means for mounting said pendulum on said vehicle for swinging in the plane of forward motion of the vehicle to be responsive to the linear deceleration of said vehicle, a flywheel driven from the wheels of said vehicle and responsive to the angular deceleration thereof, differential means connecting said flywheel and said pendulum and actuated in response to wheel slippage, brake regulating means for reducing the braking action of said brake, means connecting said differential means with said brake regulating means providing for response thereof upon the occurrence of wheel slippage to reduce the braking action of said brake, and a clutch for selectively connecting said pendulum to said regulating means to establish control thereof in the existing attitude of the vehicle.

5. In a braking control system for a wheeled vehicle having a brake, the combination of a pendulum, means for mounting said pendulum on said vehicle for swinging in the plane of forward motion of the vehicle to be responsive to the linear deceleration of said vehicle, a flywheel driven from the wheels of said vehicle and responsive to the angular deceleration thereof, differential means connecting said flywheel and said pendulum and actuated in response to wheel slippage, brake regulating means for reducing the braking action of said brake, means connecting said differential means with said brake regulating means providing for response thereof upon the occurrence of wheel slippage to reduce the braking action of said brake, a clutch for selectively connecting said pendulum to said regulating means to establish control thereof in the existing attitude of the vehicle, and means operable upon the actuation of said brake pedal for engaging said clutch.

6. In a control system for a vehicle having wheels and a brake, a pendulum having a weight on one end and a pivot at the other end over which the pendulum swings longitudinally of the vehicle, a non-rotatable shaft extending from said pendulum between said pivot and weight, a rotatable inertia member mounted on said shaft, drive means coupled to the drive for said wheels for rotating said inertia member and opposing movement of the pendulum under normal driving conditions, means for applying pressure to said brake to retard the rotation of the wheels, and means responsive to the swing of the pendulum due to the slippage of the wheels on the road for opposing the application of pressure to the brake.

7. In a control system for a vehicle having wheels and a brake, a pendulum having a weight on one end and a pivot at the other end over which the pendulum swings longitudinally of the vehicle, a non-rotatable shaft extending from said pendulum between said pivot and weight, a rotatable inertia member mounted on said shaft, drive means coupled to the drive for said wheels for rotating said inertia member and opposing movement of the pendulum under normal driving conditions, means for applying pressure to said brake to retard the rotation of the wheels, means responsive to the swing of the pendulum due to the slippage of the wheels on the road for opposing the application of pressure to the brake, means for applying a pressure to said brake, and clutch means normally disconnecting said responsive means but operated when the brake is applied for connecting said responsive means to the pendulum.

References Cited in the file of this patent
UNITED STATES PATENTS

| | | |
|---|---|---|
| 2,012,366 | Wevers | Aug. 27, 1935 |
| 2,868,338 | Lucien et al. | Jan. 13, 1959 |
| 2,907,607 | Williams | Oct. 6, 1959 |

OTHER REFERENCES

Publication: Hebberling et al., Serial No. W14,238 (German application), printed January 26, 1956.